(12) United States Patent
Wong et al.

(10) Patent No.: US 11,311,834 B2
(45) Date of Patent: Apr. 26, 2022

(54) METHOD FOR REGENERATING AMMONIA WATER AFTER CAPTURING CARBON DIOXIDE WITH AMMONIA WATER AND METHOD FOR CAPTURING CARBON DIOXIDE WITH AMMONIA WATER

(71) Applicant: National Tsing Hua University, Hsinchu (TW)

(72) Inventors: Shang-Hsiao Wong, Hsinchu (TW); Hoan Le Quoc Nguyen, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 385 days.

(21) Appl. No.: 16/676,797

(22) Filed: Nov. 7, 2019

(65) Prior Publication Data

US 2020/0353404 A1 Nov. 12, 2020

(30) Foreign Application Priority Data

May 8, 2019 (TW) ................................. 108115940

(51) Int. Cl.
*B01D 53/14* (2006.01)

(52) U.S. Cl.
CPC ..... *B01D 53/1425* (2013.01); *B01D 53/1475* (2013.01); *B01D 53/1493* (2013.01);
(Continued)

(58) Field of Classification Search
CPC ........ B01D 2252/102; B01D 2252/103; B01D 2257/504; B01D 2258/0283;
(Continued)

(56) References Cited

U.S. PATENT DOCUMENTS

2018/0264404 A1* 9/2018 Mathias ................. B01D 53/62

FOREIGN PATENT DOCUMENTS

| CN | 102218261 A | 10/2011 |
|----|-------------|---------|
| TW | I626080 B | 6/2018 |
| WO | WO 2016123386 A1 | 8/2016 |

OTHER PUBLICATIONS

Li et al., "Technical and Energy Performance of an Advanced, Aqueous Ammonia-Based $CO_2$ Capture Technology for a 500 MW Coal-Fired Power Station", Environmental Science & Technology, published on Aug. 18, 2015, vol. 49, issue 16, pp. 10243-10252, published by American Chemical Society, United States.
(Continued)

*Primary Examiner* — Cabrena Holecek
(74) *Attorney, Agent, or Firm* — Fay Sharpe LLP (57) ABSTRACT

A method for regenerating ammonia water after capturing carbon dioxide with aqueous ammonia includes steps as follow. An ammonia water regenerating system is provided, wherein the ammonia water regenerating system includes a heat exchanger, a stripper, a second pump, a first flash drum, a first compressor, a second flash drum and a second compressor. A first flashing step is performed, wherein the rich solvent is flashed to form a first steam and a first flash liquid. A first compressing step is performed, wherein the first steam is compressed. A stripping step is performed, wherein the first flash liquid is stripped. A second flashing step is performed, wherein the lean solvent is flashed to form a second steam and a second flash liquid. A second compressing step is performed, wherein the second steam is compressed.

23 Claims, 4 Drawing Sheets

(52) U.S. Cl.
CPC .. *B01D 2252/102* (2013.01); *B01D 2252/103* (2013.01); *B01D 2257/504* (2013.01); *B01D 2259/124* (2013.01)

(58) Field of Classification Search
CPC .......... B01D 2259/124; B01D 53/1425; B01D 53/1475; B01D 53/1493; C01B 32/50; Y02C 20/40; Y02P 20/10; Y02P 20/151
See application file for complete search history.

(56) References Cited

OTHER PUBLICATIONS

Nguyen et al., "New Stripper Configuration for Aqueous Ammonia-based $CO_2$ Capture Process by Integration of Lean and Rich Vapor Recompression", 2019 Symposium on Process Systems Engineering, dated on May 10-11, 2019, abstract and oral presentation, Taiwan, R.O.C.

* cited by examiner

METHOD FOR REGENERATING AMMONIA WATER AFTER CAPTURING CARBON DIOXIDE WITH AMMONIA WATER AND METHOD FOR CAPTURING CARBON DIOXIDE WITH AMMONIA WATER

RELATED APPLICATIONS

This application claims priority to Taiwan Application Serial Number 108115940, filed May 8, 2019, which is herein incorporated by reference.

BACKGROUND

Technical Field

The present disclosure relates to a method for capturing and regenerating carbon dioxide. More particularly, the present disclosure relates to a method for capturing and regenerating carbon dioxide with ammonia water.

Description of Related Art

Nowadays, about 85% energy of the industry is provided by the fossil fuel, and the fossil fuel is still the principal energy in decades to come. However, the large amount of exhaust gas produced by burning the fossil fuel causes the concentration of carbon dioxide in the atmosphere to rise rapidly. Due to carbon dioxide is the main greenhouse gas, which further causes the global environmental changes.

In order to reduce the environmental damage caused by carbon dioxide, a carbon dioxide capture system is developed, which is mainly divided into chemical/physical absorption, absorption, low temperature condensation and membrane separation. The chemical absorption method is the most common carbon dioxide capture technology currently, and is applicable to the various power plants and petrochemical plants. However, although the carbon dioxide capture system can remove carbon dioxide effectively, it is necessary to heat the stripper by a reboiler, which will generate a large amount of energy loss.

Therefore, how to improve the carbon dioxide capturing system and method can achieve the purpose of reducing carbon dioxide emissions and reducing the cost of capture, which is the goal of the relevant industry.

SUMMARY

According to one aspect of the present disclosure, a method for regenerating ammonia water after capturing carbon dioxide with ammonia water includes steps as follows. An ammonia water regenerating system is provided, wherein the ammonia water regenerating system includes a heat exchanger, a stripper, a second pump, a first flash drum, a first compressor, a second flash drum and a second compressor. The heat exchanger is for performing a heat exchange treatment on a rich solvent and a lean solvent, and providing the rich solvent. The stripper is connected to the heat exchanger. The second pump is connected to the heat exchanger via a first flow path. The first flash drum is connected between a liquid inlet of the stripper and a liquid outlet of the heat exchanger. The first compressor is connected between a gas outlet of the first flash drum and a first gas inlet of the stripper. The second flash drum is connected between a liquid outlet of the stripper and a liquid inlet of the heat exchanger. The second compressor is connected between a gas outlet of the second flash drum and a second gas inlet of the stripper. A first flashing step is performed, wherein the rich solvent is flashed in the first flash drum to form a first steam and a first flash liquid. A first compressing step is performed, wherein the first steam is compressed by the first compressor and transferred to the first gas inlet of the stripper. A stripping step is performed, wherein the first flash liquid is stripped by the first steam in the stripper to generate a carbon dioxide stripping gas and the lean solvent. A second flashing step is performed, wherein the lean solvent is flashed in the second flash drum to form a second steam and a second flash liquid. A second compressing step is performed, wherein the second steam is compressed by the second compressor and transferred to the second gas inlet of the stripper.

According to another aspect of the present disclosure, a method for capturing carbon dioxide with ammonia water includes steps as follows. A carbon dioxide capturing system is provided, wherein the carbon dioxide capturing system includes at least one carbon dioxide absorption tower, a stripper, a heat exchanger, a second pump, a first flash drum, a first compressor, a second flash drum and a second compressor. The at least one carbon dioxide absorption tower has an absorbent. The stripper is connected to a liquid outlet of the at least one carbon dioxide absorption tower. The heat exchanger is connected between the liquid outlet of the at least one carbon dioxide absorption tower and a liquid inlet of the stripper via a first flow path, and connected between a liquid outlet of the stripper and a reflow liquid inlet of the at least one carbon dioxide absorption tower via a second flow path. The second pump is connected between the heat exchanger and the liquid outlet of the at least one carbon dioxide absorption tower via the first flow path. The first flash drum is connected between the liquid inlet of the stripper and a liquid outlet of the heat exchanger. The first compressor is connected between a gas outlet of the first flash drum and a first gas inlet of the stripper. The second flash drum is connected between the liquid outlet of the stripper and a liquid inlet of the heat exchanger. The second compressor is connected between a gas outlet of the second flash drum and a second gas inlet of the stripper. An absorbing step is performed, wherein a carbon dioxide containing gas is performed a carbon dioxide absorption treatment by using the absorbent in the at least one carbon dioxide absorption tower to form a rich solvent. A first flashing step is performed, wherein the rich solvent is flashed in the first flash drum to form a first steam and a first flash liquid. A first compressing step is performed, wherein the first steam is compressed by the first compressor and transferred to the first gas inlet of the stripper. A stripping step is performed, wherein the first flash liquid is stripped by the first steam in the stripper to generate a carbon dioxide stripping gas and a lean solvent. A second flashing step is performed, wherein the lean solvent is flashed in the second flash drum to form a second steam and a second flash liquid. A second compressing step is performed, wherein the second steam is compressed by the second compressor and transferred to the second gas inlet of the stripper.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments of the present disclosure will be described below by referring the figures. For the clarity, many practical details will be explained in the following description. However, the readers should be realized that these practical details are not limited to the present disclosure. That is, in some embodiments of the present disclosure, the practical details are not necessary. In addition, in order to simplify the figures, some of the conventional structures and elements will be shown in the figures with simplified schematic; and the repeated elements will be shown by the same reference numerals.

Figure 1:
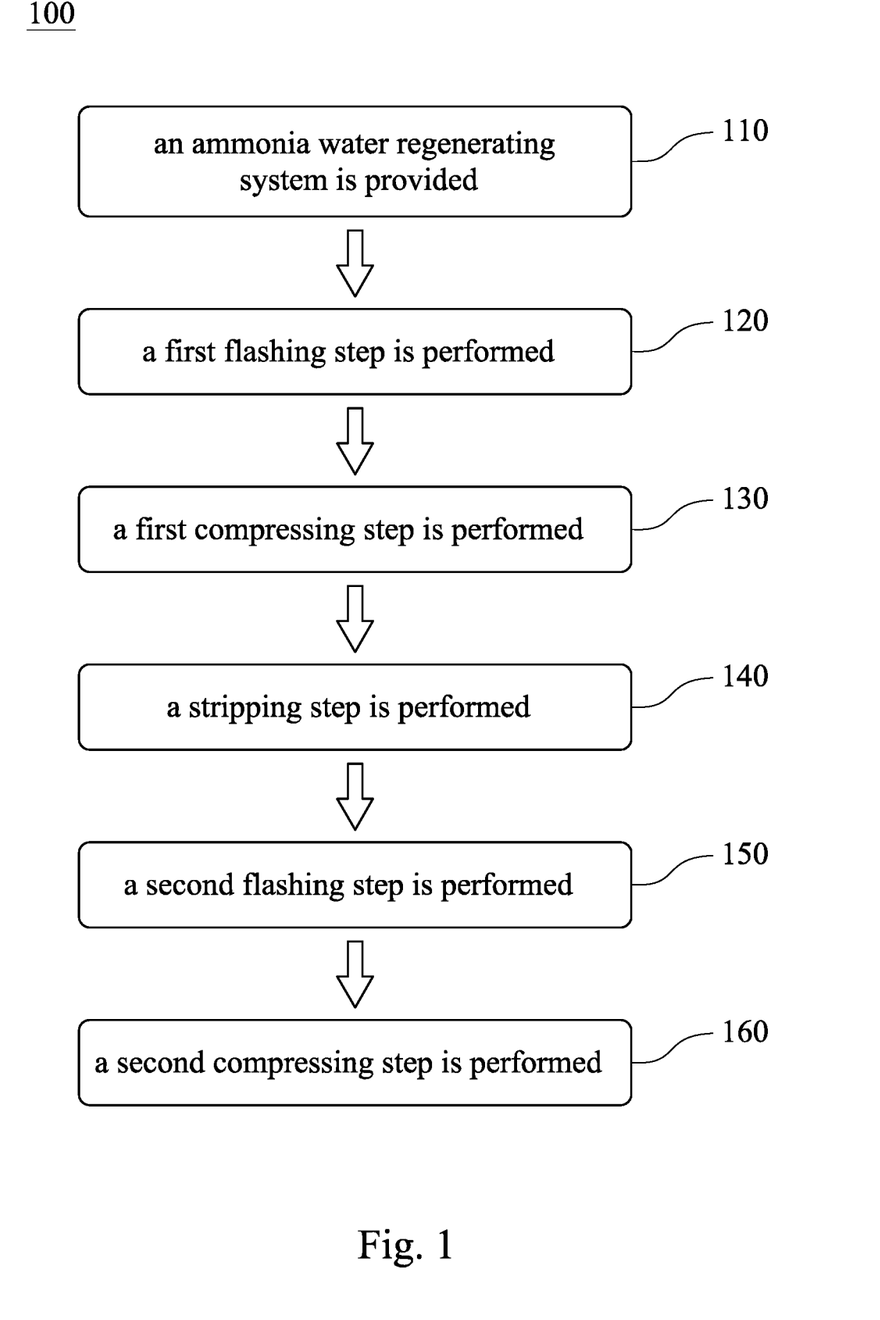
FIG. 1 is a flow chart of a method for regenerating ammonia water after capturing carbon dioxide with ammonia water according to one embodiment of the present disclosure.
Figure 2:
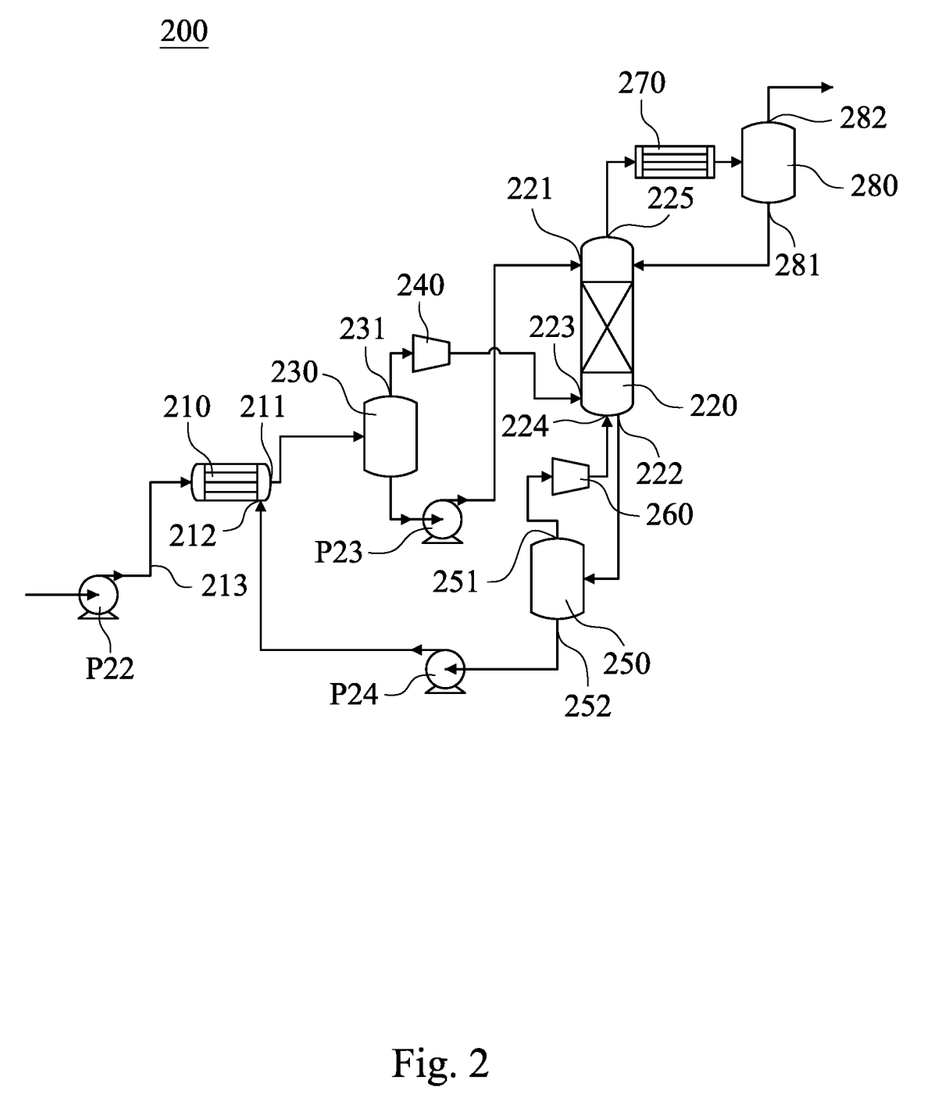
FIG. 2 is a schematic diagram of an ammonia water regenerating system as shown in FIG. 1.

Please refer to FIG. 1 and FIG. 2, wherein FIG. 1 is a flow chart of a method for regenerating ammonia water after capturing carbon dioxide with ammonia water 100 according to one embodiment of the present disclosure. FIG. 2 is a schematic diagram of an ammonia water regenerating system 200 as shown in FIG. 1. The method for regenerating ammonia water after capturing carbon dioxide with ammonia water 100 includes a step 110, a step 120, a step 130, a step 140, a step 150 and a step 160.

In the step 110, the ammonia water regenerating system 200 is provided. As shown in FIG. 2, the ammonia water regenerating system 200 includes a heat exchanger 210, a stripper 220, a second pump P22, a first flash drum 230, a first compressor 240, a second flash drum 250 and a second compressor 260. Specifically, the heat exchanger 210 is for performing a heat exchange treatment on a rich solvent and a lean solvent, and providing the rich solvent. The stripper 220 is connected to the heat exchanger 210. The second pump P22 is connected to the heat exchanger 210 via a first flow path 213. The first flash drum 230 is connected between a liquid inlet 221 of the stripper 220 and a liquid outlet 211 of the heat exchanger 210. The first compressor 240 is connected between a gas outlet 231 of the first flash drum 230 and a first gas inlet 223 of the stripper 220. The second flash drum 250 is connected between a liquid outlet 222 of the stripper 220 and a liquid inlet 212 of the heat exchanger 210. The second compressor 260 is connected between a gas outlet 251 of the second flash drum 250 and a second gas inlet 224 of the stripper 220.

In the step 120, a first flashing step is performed, wherein the rich solvent is flashed in the first flash drum 230 to form a first steam and a first flash liquid. Specifically, the rich solvent can include carbon dioxide and ammonia water, a molar ratio of carbon dioxide to ammonia water can be 0.10 to 0.41, which is a solvent with high carbon dioxide concentration. The rich solvent is transferred to the heat exchanger 210 via the second pump P22 on the first flow path 213 and heated. Then, the rich solvent enters the first flash drum 230 to perform a first flash treatment, the formed first flash liquid is transferred to the liquid inlet 221 of the stripper 220 by a third pump P23, and the first steam enters the first compressor 240 at the same time. A pressure of the second pump P22 can be 2.5 bars to 5.0 bars.

In the step 130, a first compressing step is performed, wherein the first steam is compressed by the first compressor 240 and transferred to the first gas inlet 223 of the stripper 220. The first steam and the first flash liquid are transferred to the stripper 220 by performing the first flashing step and the first compressing step, so as to help the regeneration of solvent.

In the step 140, a stripping step is performed, wherein the first flash liquid is stripped by the first steam in the stripper 220 to generate a carbon dioxide stripping gas and the lean solvent. Specifically, the first flash liquid after the first flash treatment is transferred to the top of the stripper 220, and the first steam after the compression is transferred to the bottom of the stripper 220. Carbon dioxide in the first flash liquid is converted form a liquid phase into a gas phase by the first steam used as a heat source of the first flash liquid, so as to form the carbon dioxide stripping gas. The remained first flash liquid is formed the lean solvent by removing carbon dioxide, wherein the lean solvent is a solvent with low carbon dioxide concentration.

In the step 150, a second flashing step is performed, wherein the lean solvent is flashed in the second flash drum 250 to form a second steam and a second flash liquid. Specifically, a pressure of the stripper 220 can be greater than a pressure of the second flash drum 250, so that the stripped lean solvent is performed a second flash treatment to a lower pressure via the second flash drum 250. The formed second flash liquid is flowed out from a liquid outlet 252 of the second flash drum 250, and transferred to the liquid inlet 212 of the heat exchanger 210 by a forth pump P24, the second steam enters the second compressor 260 at the same time. The pressure of the stripper 220 can be 8.5 bars to 10.5 bars, and the pressure of the second flash drum 250 can be 3.0 bars to 7.0 bars.

In the step 160, a second compressing step is performed, wherein the second steam is compressed by the second compressor 260 and transferred to the second gas inlet 224 of the stripper 220. The second flash liquid is transferred to the heat exchanger 210 by performing the second flashing step and the second compressing step, so as to perform the heat exchange. The second steam is recompressed to the stripper 220 by the second compressor 260.

The ammonia water regenerating system 200 of the present disclosure can further include a condenser 270, wherein the condenser 270 is connected to a gas outlet 225 of the stripper 220. Specifically, the method for regenerating ammonia water after capturing carbon dioxide with ammonia water 100 of the present disclosure can further include a condensing step, wherein the carbon dioxide stripping gas from the stripper 220 is condensed in the condenser 270 to form a condensed carbon dioxide stripping gas. Therefore, the moisture in the carbon dioxide stripping gas can be removed via condensation, so that the water content of the condensed carbon dioxide stripping gas is very small.

The ammonia water regenerating system 200 of the present disclosure can further include a third flash drum 280, wherein the third flash drum 280 is connected to the condenser 270. Specifically, the method for regenerating ammonia water after capturing carbon dioxide with ammonia water 100 of the present disclosure can further include a third flashing step, wherein the condensed carbon dioxide stripping gas from the condenser 270 is flashed in the third flash drum 280 to further remove excess water to form a carbon flash gas containing the high concentration of carbon dioxide. A liquid outlet 281 of the third flash drum 280 is connected to the stripper 220 and can return the water produced by the third flash drum 280 to the stripper 220. The carbon dioxide flash gas produced by the third flash drum 280 can be discharged from a gas outlet 282 of the third flash drum 280 for recycling.

Therefore, the method for regenerating ammonia water after capturing carbon dioxide with ammonia water of the present disclosure can be provided by disposing the first flash drum and the first compressor between the heat exchanger and the stripper. The rich solvent is flashed in the first flash drum, and the steam is compressed into the stripper to help the regeneration of solvent. Then, the stripped lean solvent from the stripper is flashed in the second flash drum to the lower pressure, and the steam is recompressed into the stripper. The setting of the first flash drum can be used to provide the heat source for heating the rich solvent in the stripper by using the flashed steam. The setting of the second flash drum can replace the traditional reboiler, and the produced energy loss is reduced effectively to achieve the purpose of energy saving.

Figure 3:
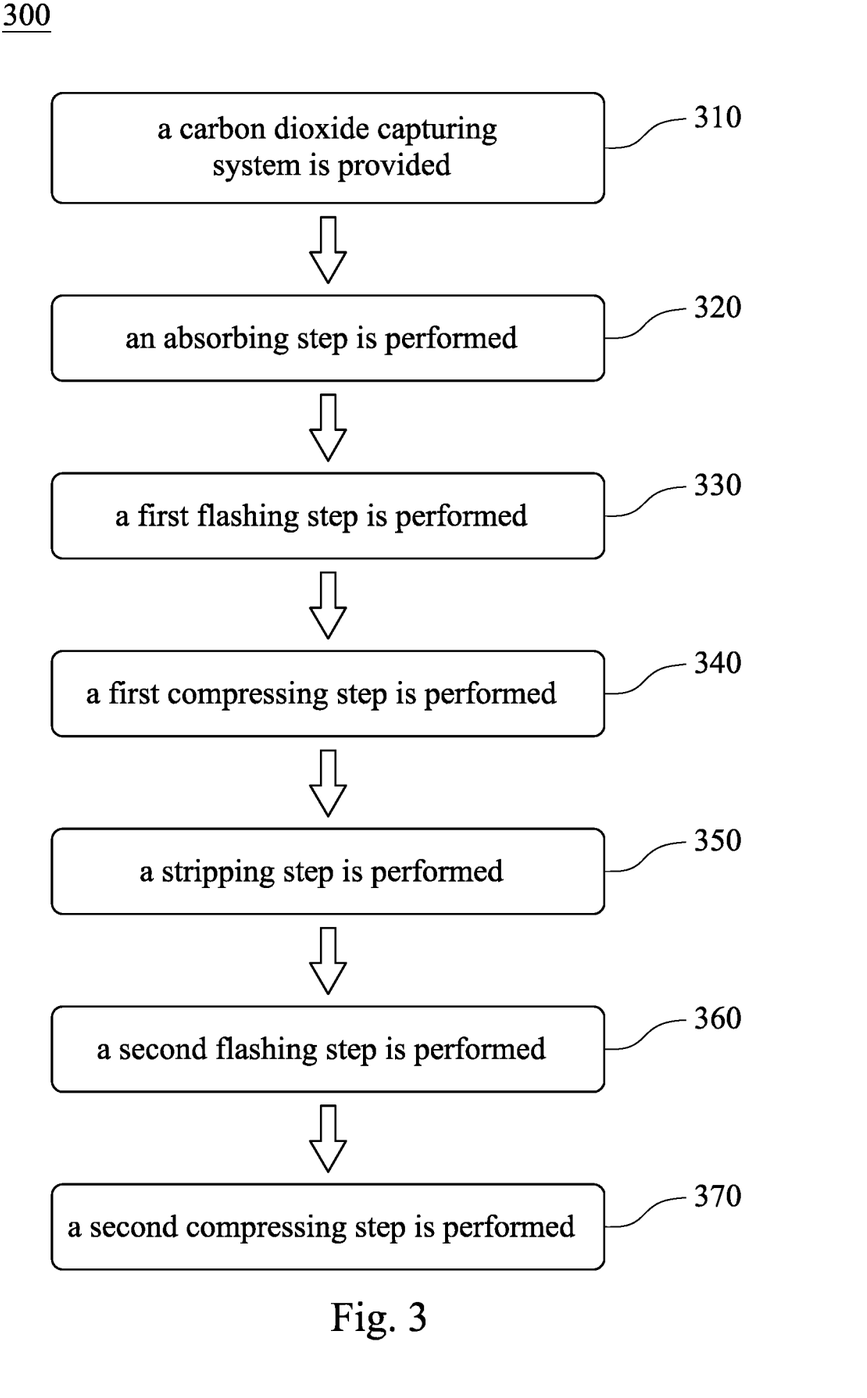
FIG. 3 is a flow chart of a method for capturing carbon dioxide with ammonia water according to another embodiment of the present disclosure.
Figure 4:
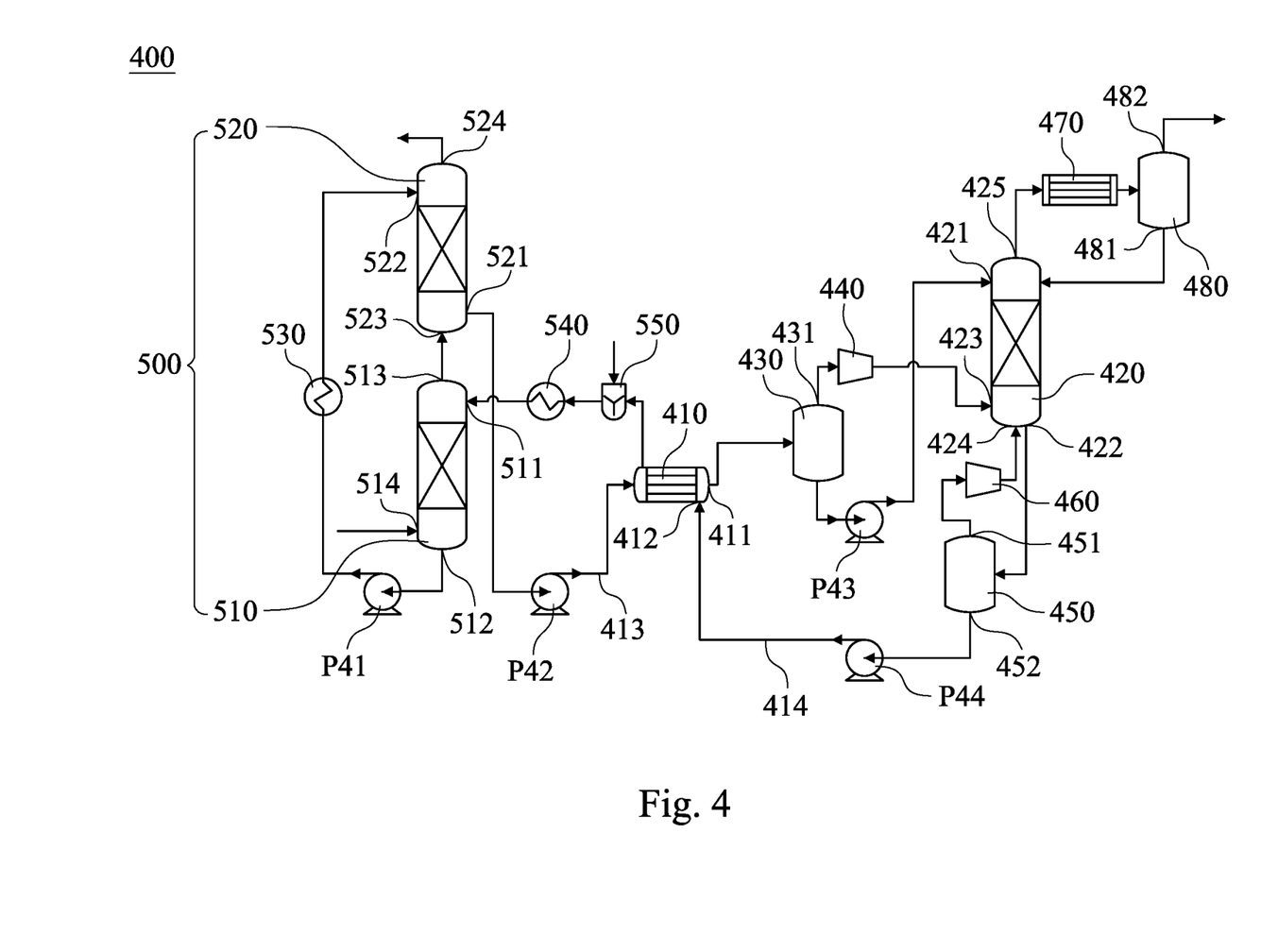
FIG. 4 is a schematic diagram of a carbon dioxide capturing system as shown in FIG. 3.

Please refer to FIG. 3 and FIG. 4, wherein FIG. 3 is a flow chart of a method for capturing carbon dioxide with ammonia water 300 according to another embodiment of the present disclosure. FIG. 4 is a schematic diagram of a carbon dioxide capturing system 400 as shown in FIG. 3. The method for capturing carbon dioxide with ammonia water 300 includes a step 310, a step 320, a step 330, a step 340, a step 350, a step 360 and a step 370.

In the step 310, the carbon dioxide capturing system 400 is provided. As shown in FIG. 4, the carbon dioxide capturing system 400 includes at least one carbon dioxide absorption tower 500, a stripper 420, a heat exchanger 410, a second pump P42, a first flash drum 430, a first compressor 440, a second flash drum 450 and a second compressor 460.

Specifically, in the embodiment of FIG. 4, the carbon dioxide absorption tower 500 is having an absorbent, and the number of the carbon dioxide absorption tower 500 is two, which are a first carbon dioxide absorption tower 510 and a second carbon dioxide absorption tower 520, respectively. The first carbon dioxide absorption tower 510 and the second carbon dioxide absorption tower 520 are connected in series, wherein the number of the carbon dioxide absorption tower 500 is not limited to the disclosure. That is, the number of the carbon dioxide absorption tower 500 can be one or more, when the number of the carbon dioxide absorption tower 500 is a plurality, the carbon dioxide capturing system 400 can include an N number of carbon dioxide absorption towers 500, and N is an integer greater than 1, wherein the N number of carbon dioxide absorption towers are connected in series in order.

The stripper 420 is connected to a liquid outlet 521 of the second carbon dioxide absorption tower 520. The heat exchanger 410 is connected between the liquid outlet 521 of the second carbon dioxide absorption tower 520 and a liquid inlet 421 of the stripper 420 via a first flow path 413, and connected between a liquid outlet 422 of the stripper 420 and a reflow liquid inlet 511 of the first carbon dioxide absorption tower 510 via a second flow path 414. The second pump P42 is connected between the heat exchanger 410 and the liquid outlet 521 of the second carbon dioxide absorption tower 520 via the first flow path 413.

The first flash drum 430 is connected between the liquid inlet 421 of the stripper 420 and a liquid outlet 411 of the heat exchanger 410. The first compressor 440 is connected between a gas outlet 431 of the first flash drum 430 and a first gas inlet 423 of the stripper 420. The second flash drum 450 is connected between the liquid outlet 422 of the stripper 420 and a liquid inlet 412 of the heat exchanger 410. The second compressor 460 is connected between a gas outlet 451 of the second flash drum 450 and a second gas inlet 424 of the stripper 420.

In the step 320, an absorbing step is performed, wherein a carbon dioxide containing gas is performed a carbon dioxide absorption treatment by using the absorbent in the carbon dioxide absorption tower 500 to form a rich solvent and a gas after the carbon dioxide absorption treatment. Specifically, the carbon dioxide containing gas is introduced into a gas inlet 514 of the first carbon dioxide absorption tower 510 and performed the carbon dioxide absorption treatment with the absorbent. The absorbent can include ammonia water having a concentration of 3 mole % to 10 mole %. The carbon dioxide containing gas can be a flue gas, and the flue gas can include 5 mole % to 30 mole % of carbon dioxide. Furthermore, the rich solvent obtained by the carbon dioxide absorption treatment can include carbon dioxide and ammonia water, and a molar ratio of carbon dioxide to ammonia water is 0.10 to 0.41, which is a solvent with high carbon dioxide concentration.

Furthermore, the carbon dioxide capturing system 400 can further include a first cooling section 530. The first cooling section 530 is connected between a liquid outlet of a first of carbon dioxide absorption tower and a liquid inlet of an N-th of carbon dioxide absorption tower in the N number of carbon dioxide absorption towers. The rich solvent from the first of carbon dioxide absorption tower is cooled by the first cooling section 530, and the cooled rich solvent is returned to the N-th of carbon dioxide absorption tower.

For instance, in the embodiment of FIG. 4, N is equal to 2 as description. Therefore, the first cooling section 530 is connected between a liquid outlet 512 of the first carbon dioxide absorption tower 510 and a liquid inlet 522 of the second carbon dioxide absorption tower 520. After the carbon dioxide containing gas is introduced into the first carbon dioxide absorption tower 510 and performed the carbon dioxide absorption treatment with the absorbent, the rich solvent from the first carbon dioxide absorption tower 510 can be transferred to the first cooling section 530 by a first pump P41. The first cooling section 530 can cool the rich solvent from the first carbon dioxide absorption tower 510, and return the cooled rich solvent to the second carbon dioxide absorption tower 520 to continue the carbon dioxide absorption treatment.

Furthermore, the gas after the carbon dioxide containing gas enters the first carbon dioxide absorption tower 510 for performing the carbon dioxide absorption treatment, then enters the second carbon dioxide absorption tower 520 via a gas outlet 513 of the first carbon dioxide absorption tower 510 and a gas inlet 523 of the second carbon dioxide absorption tower 520 for performing the carbon dioxide absorption treatment. The gas after carbon dioxide treatment is discharged from the gas outlet 524 of the second carbon dioxide absorption tower 520.

In the step 330, a first flashing step is performed, wherein the rich solvent is flashed in the first flash drum 430 to form a first steam and a first flash liquid. Specifically, the rich solvent flowed out from the liquid outlet 521 of the second carbon dioxide absorption tower 520 can be transferred to the heat exchanger 410 via the second pump P42 on the first flow path 413 and heated. Then, the rich solvent enters the first flash drum 430 to perform a first flashing treatment, the formed first flash liquid is transferred to the liquid inlet 421 of the stripper 420 by a third pump P43, and the first steam enters the first compressor 440 at the same time. A pressure of the second pump P42 can be 2.5 bars to 5.0 bars.

In the step 340, a first compressing step is performed, wherein the first steam is compressed by the first compressor 440 and transferred to the first gas inlet 423 of the stripper 420. The first steam and the first flash liquid are transferred to the stripper 420 by performing the first flashing step and the first compressing step, so as to help the regeneration of solvent.

In the step 350, a stripping step is performed, wherein the first flash liquid is stripped by the first steam in the stripper 420 to generate a carbon dioxide stripping gas and a lean solvent. Specifically, the first flash liquid after the first flash treatment is transferred to the top of the stripper 420, and the first steam after the compression is transferred to the bottom of the stripper 420. Carbon dioxide in the first flash liquid is converted form a liquid phase into a gas phase by the first steam used as a heat source of the first flash liquid, so as to form the carbon dioxide stripping gas. The remained first flash liquid is formed the lean solvent by removing carbon dioxide, wherein the lean solvent is a solvent with low carbon dioxide concentration.

In the step 360, a second flashing step is performed, wherein the lean solvent is flashed in the second flash drum 450 to form a second steam and a second flash liquid. Specifically, a pressure of the stripper 420 can be greater than a pressure of the second flash drum 450, so that the stripped lean solvent is performed a second flash treatment to a lower pressure via the second flash drum 450. The formed second flash liquid is transferred to the liquid inlet 412 of the heat exchanger 410 by a forth pump P44, the second steam enters the second compressor 460 at the same time. The pressure of the stripper 420 can be 8.5 bars to 10.5 bars, and the pressure of the second flash drum 450 can be 3.0 bars to 7.0 bars.

In the step 370, a second compressing step is performed, wherein the second steam is compressed by the second compressor 460 and transferred to the second gas inlet 424 of the stripper 420. The second flash liquid is transferred to the heat exchanger 410 by performing the second flashing step and the second compressing step, so as to perform the heat exchange. The second steam is recompressed to the stripper 420 by the second compressor 460.

Furthermore, a liquid outlet 452 of the second flash drum 450 can be connected to the reflow liquid inlet 511 of the first carbon dioxide absorption tower 510 via the second flow path 414. Specifically, the second flash liquid after the second flash treatment can be returned to the first carbon dioxide absorption tower 510 via the forth pump P44 disposed on the second flow path 414, wherein the second flash liquid is from the second flash drum 450.

The carbon dioxide capturing system 400 of the present disclosure can further include a condenser 470, wherein the condenser 470 is connected to a gas outlet 425 of the stripper 420. Specifically, the method for capturing carbon dioxide with ammonia water 300 of the present disclosure can further include a condensing step, wherein the carbon dioxide stripping gas from the stripper 420 is condensed in the condenser 470 to form a condensed carbon dioxide stripping gas. Therefore, the moisture in the carbon dioxide stripping gas can be removed via condensation, so that the water content of the condensed carbon dioxide stripping gas is very small.

The carbon dioxide capturing system 400 of the present disclosure can further include a third flash drum 480, wherein the third flash drum 480 is connected to the condenser 470. Specifically, the method for capturing carbon dioxide with ammonia water 300 of the present disclosure can further include a third flashing step, wherein the condensed carbon dioxide stripping gas from the condenser 470 is flashed in the third flash drum 480 to further remove excess water to form a carbon flash gas containing the high concentration of carbon dioxide. A liquid outlet 481 of the third flash drum 480 is connected to the stripper 420 and can return the water produced by the third flash drum 480 to the stripper 420. The carbon dioxide flash gas produced by the third flash drum 480 can be discharged from a gas outlet 482 of the third flash drum 480 for recycling.

Moreover, the method for capturing carbon dioxide with ammonia water 300 of the present disclosure can further include a heat exchanging step. The rich solvent in the first flow path 413 is a cold fluid, and the lean solvent in the second flow path 414 is a hot fluid. Accordingly, a heat exchange treatment can be performed on the rich solvent and the lean solvent in the heat exchanger 410. After the heat exchange treatment is performed, the temperature of the rich solvent can be increased and the temperature of the lean solvent can be reduced.

The carbon dioxide capturing system 400 of the present disclosure can further include a second cooling section 540, the second cooling section 540 is connected between the heat exchanger 410 and the reflow liquid inlet 511 of the first carbon dioxide absorption tower 510. Accordingly, the second cooling section 540 can cool the lean solvent after the heat exchange treatment. Furthermore, in the embodiment of FIG. 4, a storage tank 550 is disposed between the second cooling section 540 and the heat exchange 410. Due to the carbon dioxide capturing system 400 will cause ammonia water escape during the operation. In order to maintain the mass balance of the carbon dioxide capturing system 400, the storage tank 550 is disposed to use as ammonia compensation.

Therefore, the method for capturing carbon dioxide with ammonia water of the present disclosure can be provided by disposing the first flash drum and the first compressor between the heat exchanger and the stripper, and disposing the second flash drum and the second compressor to replace the traditional reboiler. The formed ammonia water regenerating system is collocated with the carbon dioxide absorption tower can greatly reduce the energy consumption and achieve the purpose of reducing carbon dioxide emissions and capturing costs.

Example and Comparative Example

Example 1 and Example 2 of the present disclosure are based on the step 310 to the step 370 of the method for capturing carbon dioxide with ammonia water 300 in FIG. 3 for capturing carbon dioxide in the carbon dioxide containing gas. Equivalent work ($W_{equiv}$), total work ($W_t$) and energy penalty (EP %) are calculated by formula (I), formula (II) and formula (III), respectively. The formula (I), the formula (II) and the formula (III) are represented as follows:

$$W_{equiv}\left[\frac{MWh}{ton\ CO_2}\right] = 0.75 \times \left(1 - \frac{T_0}{(T_{reb}[K] + 10)}\right) \times Q_{reb}\left[\frac{MWh}{ton\ CO_2}\right], \quad \text{formula (I)}$$

$$W_t\left[\frac{MWh}{ton\ CO_2}\right] = W_{equiv}\left[\frac{MWh}{ton\ CO_2}\right] + W_{comp}\left[\frac{MWh}{ton\ CO_2}\right], \quad \text{formula (II)}$$

-continued $$EP\% = 0.9 \left[ \frac{\text{ton CO}_2}{\text{MWh}} \right] \times W_t \left[ \frac{\text{MWh}}{\text{ton CO}_2} \right] \times 100\%, \quad \text{formula (III)}$$

wherein $T_0$ is 300 K.

In Example 1, the pressure of the stripper is set to 10.5 bars, the pressure of the second flash drum is set to 6.6 bars and the pressure of the second pump is set to 4.265 bars. The absorbent includes ammonia water having the concentration of 5.5 mole %. The rich solvent is obtained after the carbon dioxide absorption treatment performed by the absorbent and the carbon dioxide containing gas. In the rich solvent, the molar ratio of carbon dioxide to ammonia water is 0.406. After the rich solvent is flashed by the first flash drum, the formed first steam and the first flash liquid are introduced into the stripper to perform the stripping treatment, so as to obtain the lean solvent. After the lean solvent is flashed by the second flash drum, the molar ratio of carbon dioxide to ammonia water is 0.25. The lean solvent includes ammonia water having the concentration of 5.5 mole %. The results of Example 1 are shown in Table 1.

TABLE 1

|  | Example 1 |
| --- | --- |
| Carbon dioxide removal efficiency (%) | 90 |
| Reboiler duty (MWh/tons CO$_2$ captured) | 0 |
| Temperature of reboiler (° C.) | N/A |
| Compression work (MWh/tons CO$_2$ captured) | 0.052 |
| Equivalent work (MWh/tons CO$_2$ captured) | N/A |
| Total work (MWh/tons CO$_2$ captured) | 0.052 |
| Energy penalty (%) | 4.71 |

N/A: Not applicable

In Example 2, the pressure of the stripper is set to 8.5 bars, the pressure of the second flash drum is set to 3.8 bars and the pressure of the second pump is set to 3.0 bars. The absorbent includes ammonia water having the concentration of 10 mole %. The rich solvent is obtained after the carbon dioxide absorption treatment performed by the absorbent and the carbon dioxide containing gas. In the rich solvent, the molar ratio of carbon dioxide to ammonia water is 0.396. After the rich solvent is flashed by the first flash drum, the formed first steam and the first flash liquid are introduced into the stripper to perform the stripping treatment, so as to obtain the lean solvent. After the lean solvent is flashed by the second flash drum, the molar ratio of carbon dioxide to ammonia water is 0.30. The lean solvent includes ammonia water having the concentration of 10 mole %. The results of Example 2 are shown in Table 2.

TABLE 2

|  | Example 2 |
| --- | --- |
| Carbon dioxide removal efficiency (%) | 80 |
| Reboiler duty (MWh/tons CO$_2$ captured) | 0 |
| Temperature of reboiler (° C.) | N/A |
| Compression work (MWh/tons CO$_2$ captured) | 0.074 |
| Equivalent work (MWh/tons CO$_2$ captured) | N/A |
| Total work (MWh/tons CO$_2$ captured) | 0.074 |
| Energy penalty (%) | 6.69 |

N/A: Not applicable

The difference between Comparative Example 1 and Comparative Example 2 of the present disclosure and Example 1 and Example 2 is that in the carbon dioxide capturing system, the first flash drum and the first compressor are removed, and the second flash drum and the second compressor are replaced to the reboiler. The other steps of Comparative Example 1 and Comparative Example 2 are the same as Example 1 and Example 2, so as to capture carbon dioxide in the carbon dioxide containing gas. Furthermore, the concentration of the absorbent, the pressure of the stripper, the molar ratio of carbon dioxide to ammonia water in the rich solvent and the molar ratio of carbon dioxide to ammonia water in the lean solvent of Comparative Example 1 are the same as that of Example 1. The concentration of the absorbent, the pressure of the stripper, the molar ratio of carbon dioxide to ammonia water in the rich solvent and the molar ratio of carbon dioxide to ammonia water in the lean solvent of Comparative Example 2 are the same as that of Example 2. The details are not described herein, and the results of Comparative Example 1 and Comparative Example 2 are shown in Table 3 and Table 4, respectively.

TABLE 3

|  | Comparative Example 1 |
| --- | --- |
| Carbon dioxide removal efficiency (%) | 90 |
| Reboiler duty (MWh/tons CO$_2$ captured) | 1.124 |
| Temperature of reboiler (° C.) | 143.81 |
| Compression work (MWh/tons CO$_2$ captured) | N/A |
| Equivalent work (MWh/tons CO$_2$ captured) | 0.25 |
| Total work (MWh/tons CO$_2$ captured) | 0.25 |
| Energy penalty (%) | 22.54 |

N/A: Not applicable

TABLE 4

|  | Comparative Example 2 |
| --- | --- |
| Carbon dioxide removal efficiency (%) | 80 |
| Reboiler duty (MWh/tons CO$_2$ captured) | 1.135 |
| Temperature of reboiler (° C.) | 128.73 |
| Compression work (MWh/tons CO$_2$ captured) | N/A |
| Equivalent work (MWh/tons CO$_2$ captured) | 0.231 |
| Total work (MWh/tons CO$_2$ captured) | 0.231 |
| Energy penalty (%) | 20.80 |

N/A: Not applicable

The difference between Comparative Example 3 and Comparative Example 4 of the present disclosure and Example 1 and Example 2 is that in the carbon dioxide capturing system, the second flash drum and the second compressor are replaced to the reboiler. The other steps of Comparative Example 3 and Comparative Example 4 are the same as Example 1 and Example 2, so as to capture carbon dioxide in the carbon dioxide containing gas. Furthermore, the concentration of the absorbent, the pressure of the stripper, the molar ratio of carbon dioxide to ammonia water in the rich solvent and the molar ratio of carbon dioxide to ammonia water in the lean solvent of Comparative Example 3 are the same as that of Example 1, but the pressure of the second pump is 6.19 bars. The concentration of the absorbent, the pressure of the stripper, the molar ratio of carbon dioxide to ammonia water in the rich solvent and the molar ratio of carbon dioxide to ammonia water in the lean solvent of Comparative Example 4 are the same as that of Example 2, but the pressure of the second pump is 4.31 bars. The details are not described herein, and the results of Comparative Example 3 and Comparative Example 4 are shown in Table 5 and Table 6, respectively.

TABLE 5

|  | Comparative Example 3 |
|---|---|
| Carbon dioxide removal efficiency (%) | 90 |
| Reboiler duty (MWh/tons $CO_2$ captured) | 0.513 |
| Temperature of reboiler (° C.) | 143.789 |
| Compression work (MWh/tons $CO_2$ captured) | 0.025 |
| Equivalent work (MWh/tons $CO_2$ captured) | 0.114 |
| Total work (MWh/tons $CO_2$ captured) | 0.139 |
| Energy penalty (%) | 12.50 |

N/A: Not applicable

TABLE 6

|  | Comparative Example 4 |
|---|---|
| Carbon dioxide removal efficiency (%) | 80 |
| Reboiler duty (MWh/tons $CO_2$ captured) | 0.511 |
| Temperature of reboiler (° C.) | 143.737 |
| Compression work (MWh/tons $CO_2$ captured) | 0.035 |
| Equivalent work (MWh/tons $CO_2$ captured) | 0.104 |
| Total work (MWh/tons $CO_2$ captured) | 0.139 |
| Energy penalty (%) | 12.50 |

N/A: Not applicable

The difference between Comparative Example 5 and Comparative Example 6 of the present disclosure and Example 1 and Example 2 is that in the carbon dioxide capturing system, the first flash drum and the first compressor are removed. The other steps of Comparative Example 5 and Comparative Example 6 are the same as Example 1 and Example 2, so as to capture carbon dioxide in the carbon dioxide containing gas. Furthermore, the concentration of the absorbent, the pressure of the stripper, the molar ratio of carbon dioxide to ammonia water in the rich solvent and the molar ratio of carbon dioxide to ammonia water in the lean solvent of Comparative Example 5 are the same as that of Example 1, but the pressure of the second flash drum is 3.904 bars. The concentration of the absorbent, the pressure of the stripper, the molar ratio of carbon dioxide to ammonia water in the rich solvent and the molar ratio of carbon dioxide to ammonia water in the lean solvent of Comparative Example 6 are the same as that of Example 2, but the pressure of the second flash drum is 3.22 bars. The details are not described herein, and the results of Comparative Example 5 and Comparative Example 6 are shown in Table 7 and Table 8, respectively.

TABLE 7

|  | Comparative Example 5 |
|---|---|
| Carbon dioxide removal efficiency (%) | 90 |
| Reboiler duty (MWh/tons $CO_2$ captured) | 0 |
| Temperature of reboiler (° C.) | N/A |
| Compression work (MWh/tons $CO_2$ captured) | 0.1 |
| Equivalent work (MWh/tons $CO_2$ captured) | N/A |
| Total work (MWh/tons $CO_2$ captured) | 0.1 |
| Energy penalty (%) | 9.05 |

N/A: Not applicable

TABLE 8

|  | Comparative Example 6 |
|---|---|
| Carbon dioxide removal efficiency (%) | 80 |
| Reboiler duty (MWh/tons $CO_2$ captured) | 0 |
| Temperature of reboiler (° C.) | N/A |
| Compression work (MWh/tons $CO_2$ captured) | 0.103 |

TABLE 8-continued

|  | Comparative Example 6 |
|---|---|
| Equivalent work (MWh/tons $CO_2$ captured) | N/A |
| Total work (MWh/tons $CO_2$ captured) | 0.103 |
| Energy penalty (%) | 9.27 |

N/A: Not applicable

As shown in Table 1 to Table 8, the energy loss of Example 1 and Example 2 is smaller than that of Comparative 1 to Comparative 6. Therefore, the carbon dioxide capturing system of Example 1 and Example 2 of the present disclosure, the first flash drum and the first compressor are disposed between the heat exchanger and the stripper. The second flash drum and the second compressor are used to replace the conventional reboiler. The energy loss can effectively be reduced.

In conclusion, the present disclosure provides the method for regenerating ammonia water after capturing carbon dioxide with ammonia water and the method for capturing carbon dioxide with ammonia water are provided. The carbon dioxide capturing system of the present disclosure can effectively capture carbon dioxide in the carbon dioxide containing gas, and reduce the energy loss generated when capturing carbon dioxide, so as to achieve the propose of energy saving.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for regenerating ammonia water after capturing carbon dioxide with ammonia water, comprising:
providing an ammonia water regenerating system, comprising:
a heat exchanger for performing a heat exchange treatment on a rich solvent and a lean solvent, and providing the rich solvent;
a stripper connected to the heat exchanger;
a second pump connected to the heat exchanger via a first flow path;
a first flash drum connected between a liquid inlet of the stripper and a liquid outlet of the heat exchanger;
a first compressor connected between a gas outlet of the first flash drum and a first gas inlet of the stripper;
a second flash drum connected between a liquid outlet of the stripper and a liquid inlet of the heat exchanger; and
a second compressor connected between a gas outlet of the second flash drum and a second gas inlet of the stripper;
performing a first flashing step, wherein the rich solvent is flashed in the first flash drum to form a first steam and a first flash liquid;
performing a first compressing step, wherein the first steam is compressed by the first compressor and transferred to the first gas inlet of the stripper;

performing a stripping step, wherein the first flash liquid is stripped by the first steam in the stripper to generate a carbon dioxide stripping gas and the lean solvent;

performing a second flashing step, wherein the lean solvent is flashed in the second flash drum to form a second steam and a second flash liquid; and performing a second compressing step, wherein the second steam is compressed by the second compressor and transferred to the second gas inlet of the stripper.

2. The method for regenerating ammonia water after capturing carbon dioxide with ammonia water of claim 1, wherein a pressure of the stripper is greater than a pressure of the second flash drum.

3. The method for regenerating ammonia water after capturing carbon dioxide with ammonia water of claim 2, wherein the pressure of the stripper is 8.5 bars to 10.5 bars, and the pressure of the second flash drum is 3.0 bars to 7.0 bars.

4. The method for regenerating ammonia water after capturing carbon dioxide with ammonia water of claim 1, wherein a pressure of the second pump is 2.5 bars to 5.0 bars.

5. The method for regenerating ammonia water after capturing carbon dioxide with ammonia water of claim 1, wherein the rich solvent comprises carbon dioxide and ammonia water, and a molar ratio of carbon dioxide to ammonia water is 0.10 to 0.41.

6. The method for regenerating ammonia water after capturing carbon dioxide with ammonia water of claim 1, wherein the ammonia water regenerating system further comprises a condenser connected to a gas outlet of the stripper.

7. The method for regenerating ammonia water after capturing carbon dioxide with ammonia water of claim 6, wherein the ammonia water regenerating system further comprises a third flash drum connected to the condenser.

8. The method for regenerating ammonia water after capturing carbon dioxide with ammonia water of claim 7, further comprising:
a condensing step, wherein the carbon dioxide stripping gas is condensed in the condenser to form a condensed carbon dioxide stripping gas.

9. The method for regenerating ammonia water after capturing carbon dioxide with ammonia water of claim 8, further comprising:
a third flashing step, wherein the condensed carbon dioxide stripping gas is flashed in the third flash drum to form a carbon dioxide flash gas.

10. A method for capturing carbon dioxide with ammonia water, comprising:
providing a carbon dioxide capturing system, comprising:
at least one carbon dioxide absorption tower having an absorbent;
a stripper connected to a liquid outlet of the at least one carbon dioxide absorption tower;
a heat exchanger connected between the liquid outlet of the at least one carbon dioxide absorption tower and a liquid inlet of the stripper via a first flow path, and connected between a liquid outlet of the stripper and a reflow liquid inlet of the at least one carbon dioxide absorption tower via a second flow path;
a second pump connected between the heat exchanger and the liquid outlet of the at least one carbon dioxide absorption tower via the first flow path;
a first flash drum connected between the liquid inlet of the stripper and a liquid outlet of the heat exchanger;
a first compressor connected between a gas outlet of the first flash drum and a first gas inlet of the stripper;
a second flash drum connected between the liquid outlet of the stripper and a liquid inlet of the heat exchanger; and
a second compressor connected between a gas outlet of the second flash drum and a second gas inlet of the stripper;

performing an absorbing step, wherein a carbon dioxide containing gas is performed a carbon dioxide absorption treatment by using the absorbent in the at least one carbon dioxide absorption tower to form a rich solvent;

performing a first flashing step, wherein the rich solvent is flashed in the first flash drum to form a first steam and a first flash liquid;

performing a first compressing step, wherein the first steam is compressed by the first compressor and transferred to the first gas inlet of the stripper;

performing a stripping step, wherein the first flash liquid is stripped by the first steam in the stripper to generate a carbon dioxide stripping gas and a lean solvent;

performing a second flashing step, wherein the lean solvent is flashed in the second flash drum to form a second steam and a second flash liquid; and performing a second compressing step, wherein the second steam is compressed by the second compressor and transferred to the second gas inlet of the stripper.

11. The method for capturing carbon dioxide with ammonia water of claim 10, wherein the carbon dioxide containing gas is a flue gas, and the flue gas comprises 5 mole % to 30 mole % of carbon dioxide.

12. The method for capturing carbon dioxide with ammonia water of claim 10, wherein the absorbent comprises ammonia water having a concentration of 3 mole % to 10 mole %.

13. The method for capturing carbon dioxide with ammonia water of claim 10, wherein the rich solvent comprises carbon dioxide and ammonia water, and a molar ratio of carbon dioxide to ammonia water is 0.10 to 0.41.

14. The method for capturing carbon dioxide with ammonia water of claim 10, wherein a pressure of the stripper is greater than a pressure of the second flash drum.

15. The method for capturing carbon dioxide with ammonia water of claim 14, wherein the pressure of the stripper is 8.5 bars to 10.5 bars, and the pressure of the second flash drum is 3.0 bars to 7.0 bars.

16. The method for capturing carbon dioxide with ammonia water of claim 10, wherein a pressure of the second pump is 2.5 bars to 5.0 bars.

17. The method for capturing carbon dioxide with ammonia water of claim 10, wherein when a number of the at least one carbon dioxide absorption tower is a plurality, the carbon dioxide capturing system comprises an N number of carbon dioxide absorption towers, N is an integer greater than 1, and the N number of carbon dioxide absorption towers are connected in series in order.

18. The method for capturing carbon dioxide with ammonia water of claim 17, wherein the carbon dioxide capturing system further comprises:
a first cooling section connected between a liquid outlet of a first of carbon dioxide absorption tower and a liquid inlet of an N-th of carbon dioxide absorption tower in the N number of carbon dioxide absorption towers; and
a second cooling section connected between the heat exchanger and the reflow liquid inlet of the at least one carbon dioxide absorption tower.

19. The method for capturing carbon dioxide with ammonia water of claim 10, wherein the carbon dioxide capturing system further comprises a condenser connected to a gas outlet of the stripper.

20. The method for capturing carbon dioxide with ammonia water of claim 19, wherein the carbon dioxide capturing system further comprises a third flash drum connected to the condenser.

21. The method for capturing carbon dioxide with ammonia water of claim 20, further comprising:
   a condensing step, wherein the carbon dioxide stripping gas is condensed in the condenser to form a condensed carbon dioxide stripping gas.

22. The method for capturing carbon dioxide with ammonia water of claim 21, further comprising:
   a third flashing step, wherein the condensed carbon dioxide stripping gas is flashed in the third flash drum to form a carbon dioxide flash gas.

23. The method for capturing carbon dioxide with ammonia water of claim 10, further comprising:
   a heat exchanging step, wherein the rich solvent and the lean solvent are performed a heat exchange treatment in the heat exchanger.

\* \* \* \* \*